US012361916B2

(12) United States Patent
Liao

(10) Patent No.: US 12,361,916 B2
(45) Date of Patent: Jul. 15, 2025

(54) DRUM FRAME CLAMPING STAND

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 248 days.

(21) Appl. No.: 18/334,050

(22) Filed: Jun. 13, 2023

(65) Prior Publication Data

US 2024/0420664 A1 Dec. 19, 2024

(51) Int. Cl.
*G10D 13/00* (2020.01)
*G10D 13/10* (2020.01)

(52) U.S. Cl.
CPC .................................... *G10D 13/28* (2020.02)

(58) Field of Classification Search
CPC ......... G10D 13/28; G10D 13/02; G10D 13/00
See application file for complete search history.

(56) References Cited

U.S. PATENT DOCUMENTS 6,344,605 B1 2/2002 Liao
7,511,209 B1 * 3/2009 Liao ...................... G10D 13/02
84/411 R

* cited by examiner

*Primary Examiner* — Kimberly R Lockett
(74) *Attorney, Agent, or Firm* — Muncy, Geissler, Olds & Lowe, P.C.

(57) ABSTRACT

A drum frame clamping stand is clamped and fixed on a drum frame, and includes an upper clamping piece, a lower clamping piece and a screw locking piece. The upper clamping piece is provided with a locking and connecting structure. The upper clamping piece and the lower clamping piece are pivotally connected through a rotary shaft. A driving part and a driven part are respectively formed on the rotary shaft. The driven part includes an upper clamping end positioned on the drum frame. The lower clamping piece includes a abutting curved surface and a fixing part. The fixing part includes a lower clamping end. The screw locking piece passes through the driving part in a screw locking manner and presses against the abutting curved surface. The drum frame can share weights of devices arranged on the locking and connecting structure to reduce the stress of the screw locking piece.

8 Claims, 7 Drawing Sheets

DRUM FRAME CLAMPING STAND

FIELD OF THE INVENTION

The present invention relates to a drum frame clamping stand, and particularly relates to an assembly and disassembly structure of a drum frame clamping stand.

BACKGROUND OF THE INVENTION

A drum frame clamper is mainly used for clamping a drum frame of a drum musical instrument, so as to additionally arrange various musical instruments or auxiliary devices, such as a cymbal, a microphone, a mobile phone and a camera on the periphery of the drum musical instrument by utilizing the drum frame clamper.

U.S. Pat. No. 6,344,605 B1 discloses a drum frame clamper having an L-shaped fixed clamping block, a movable clamping block, and an adjusting stud, wherein the movable clamping block can be driven to rotate relative to the fixed clamping block by means of the rotation of the adjusting stud, so as to enable the movable clamping block to draw close to the fixed clamping block to be clamped on the drum frame.

For this conventional clamping structure, the L-shaped fixed clamping block is used for clamping a lower edge of the drum frame, the movable clamping block is used for clamping an upper edge of the drum frame, the L-shaped fixed clamping block is further provided with a locking and connecting structure, and various musical instruments or auxiliary devices can be erected on the locking and connecting structure. As the L-shaped fixed clamping block is used for clamping the lower edge of the drum frame, weights of various musical instruments or auxiliary devices can directly act on the adjusting stud, thereby resulting in that the adjusting stud is relatively unsmooth in rotation, and the adjusting stud is relatively easy to loosen and disengage from the clamping of the drum frame.

SUMMARY OF THE INVENTION

A main object of the present invention is to disclose a drum frame clamping stand which is clamped and fixed on a drum frame. Weights of various musical instruments or auxiliary devices cannot directly act on a screw locking piece, so that the screw locking piece has improved smoothness in operation, and is not easy to generate noise interference, and the drum frame can be loosened or clamped as long as the screw locking piece is rotated, so as to meet the requirements of rapid assembly and disassembly.

In order to achieve the above object, the present invention provides a drum frame clamping stand used for being clamped and fixed on a drum frame. The drum frame clamping stand includes an upper clamping piece, a lower clamping piece and a screw locking piece, wherein the upper clamping piece is provided with a locking and connecting structure, the upper clamping piece and the lower clamping piece are pivotally connected with each other through a rotary shaft, a driving part and a driven part are respectively formed on two sides of the rotary shaft by the upper clamping piece, and the driven part includes an upper clamping end positioned on the drum frame.

Moreover, the lower clamping piece includes a abutting curved surface and a fixing part, the fixing part includes a lower clamping end positioned below the drum frame, while the screw locking piece passes through the driving part in a screw locking manner and abuts against the abutting curved surface of the lower clamping piece, the spiral rotation of the screw locking piece can drive the driving part to move, and the upper clamping piece is rotated relative to the lower clamping piece, so as to enable the upper clamping end to draw close to the lower clamping end to clamp the drum frame.

Accordingly, the locking and connecting structure is used for arranging various musical instruments or auxiliary devices. According to the present invention, the upper clamping piece is rotated relative to the lower clamping piece by taking the rotary shaft as an axis as long as the screw locking piece is rotated, the upper clamping end is closed to the lower clamping end to clamp the drum frame. As the upper clamping end of the upper clamping piece is positioned on the drum frame, the drum frame can share weights of various musical instruments or auxiliary devices arranged on the locking and connecting structure, and a force cannot be directly applied to the screw locking piece, so that the screw locking piece of the present invention is smooth in operation and not easy to generate noise interference, and the drum frame can be loosened or clamped as long as the screw locking piece is rotated, so as to meet the requirements of rapid assembly and disassembly.

DETAILED DESCRIPTION OF THE PREFERRED EMBODIMENTS

Figure 1:
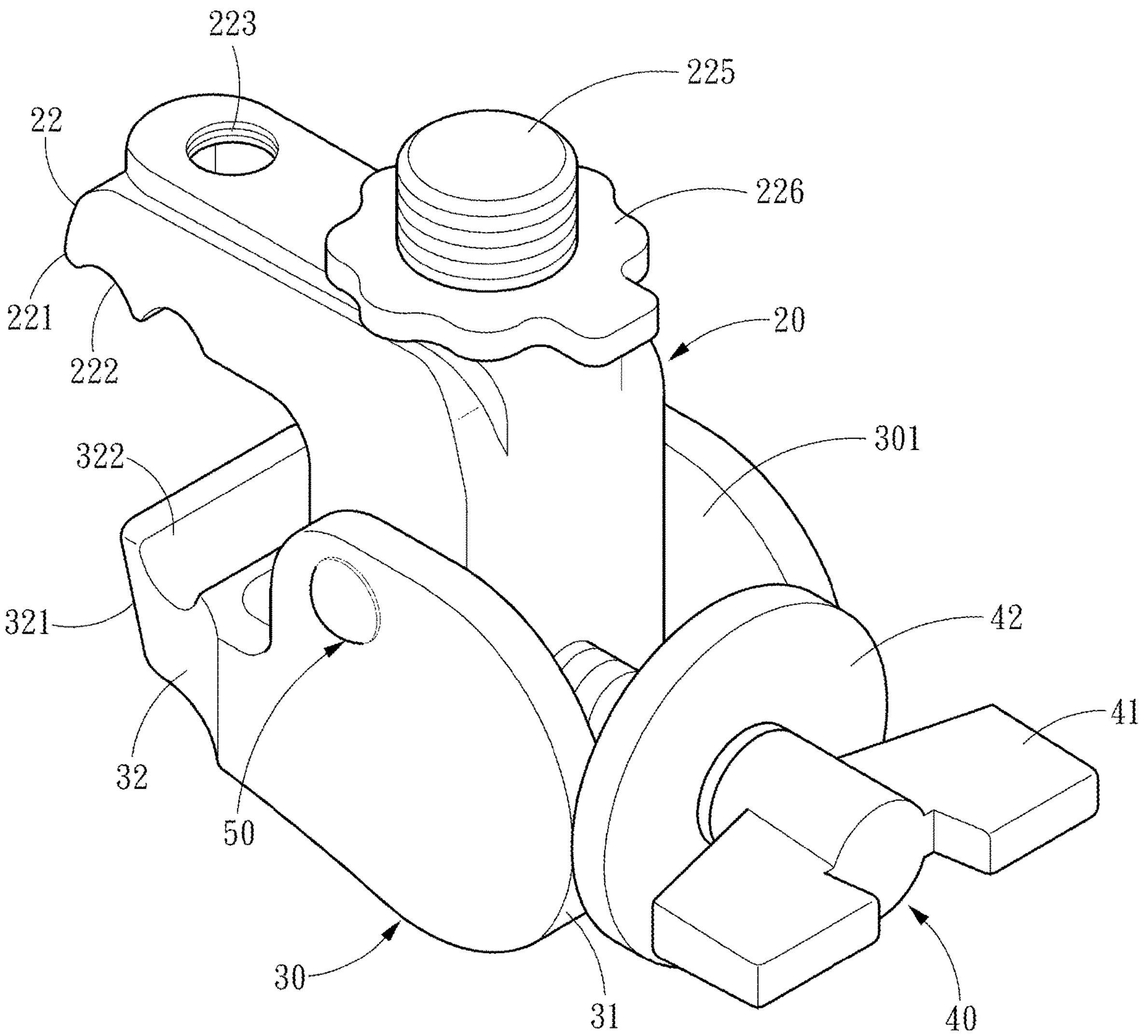
FIG. 1 is a combined structural view of the present invention.

The technical contents, features and effects of the present invention will become apparent from the following detailed description of the preferred examples in conjunction with the accompanying drawings.

Referring to FIG. 1, FIG. 2, FIG. 3 and FIG. 4, the present invention provides a drum frame clamping stand used for being clamped and fixed on a drum frame 10. The drum frame clamping stand includes an upper clamping piece 20, a lower clamping piece 30 and a screw locking piece 40, wherein the upper clamping piece 20 and the lower clamping piece 30 are pivotally connected with each other through a rotary shaft 50, a driving part 21 and a driven part 22 are respectively formed on two sides of the rotary shaft 50 by the upper clamping piece 20, and the driven part 22 includes an upper clamping end 221 positioned on the drum frame 10.

The lower clamping piece 30 includes an abutting curved surface 31 and a fixing part 32, the fixing part 32 includes a lower clamping end 321 positioned below the drum frame 10, while the screw locking piece 40 passes through the driving part 21 in a screw locking manner and abuts against the abutting curved surface 31 of the lower clamping piece 30. In an example, the driving part 21 is embedded with a nut 211 non-rotated relative to the driving part 21, the driving part 21 is made of plastic steel to have a shock absorption capability, so as to effectively reduce noise interference, and the driving part 21 includes a through hole 212, the nut 211 is exposed via the through hole 212, and the screw locking piece 40 passes through the through hole 212 to be screwed into the nut 211. As the nut 211 is non-rotate relative to the driving part 21, the rotation of the screw locking piece 40 drives the driving part 21 to move through the nut 211. The upper clamping piece 20 is rotated relative to the lower clamping piece 30 by taking the rotary shaft 50 as an axis, the upper clamping end 221 is closed to the lower clamping end 321 to clamp the drum frame 10.

In implementation, the lower clamping piece 30 includes an accommodating groove 301 provided for the driving part 21 of the upper clamping piece 20 being placed into thereof, so that the upper clamping piece 20 and the lower clamping piece 30 are pivotally connected with each other bilateral-symmetrically to maintain the balance of the integral component. The screw locking piece 40 includes a knob head 41 and a pushing plate 42, the knob head 41 provides a finger gripping space to facilitate rotation of the screw locking piece 40, and the pushing plate 42 is used for abutting against the abutting curved surface 31 to improve the stability of rotating of the upper clamping piece 20 relative to the lower clamping piece 30.

Figure 5A:
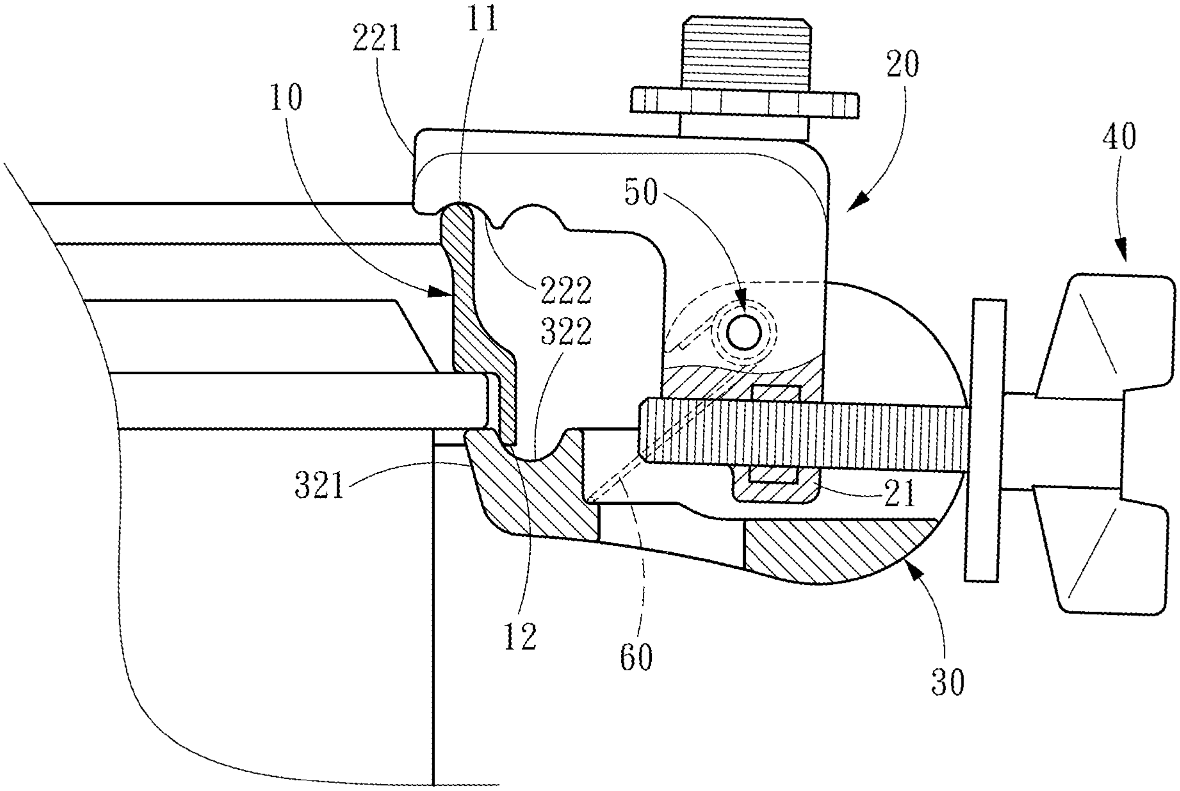
FIGS. 5A-5B are cross-sectional structural action views of clamping a drum frame according to the present invention.
Figure 5B:
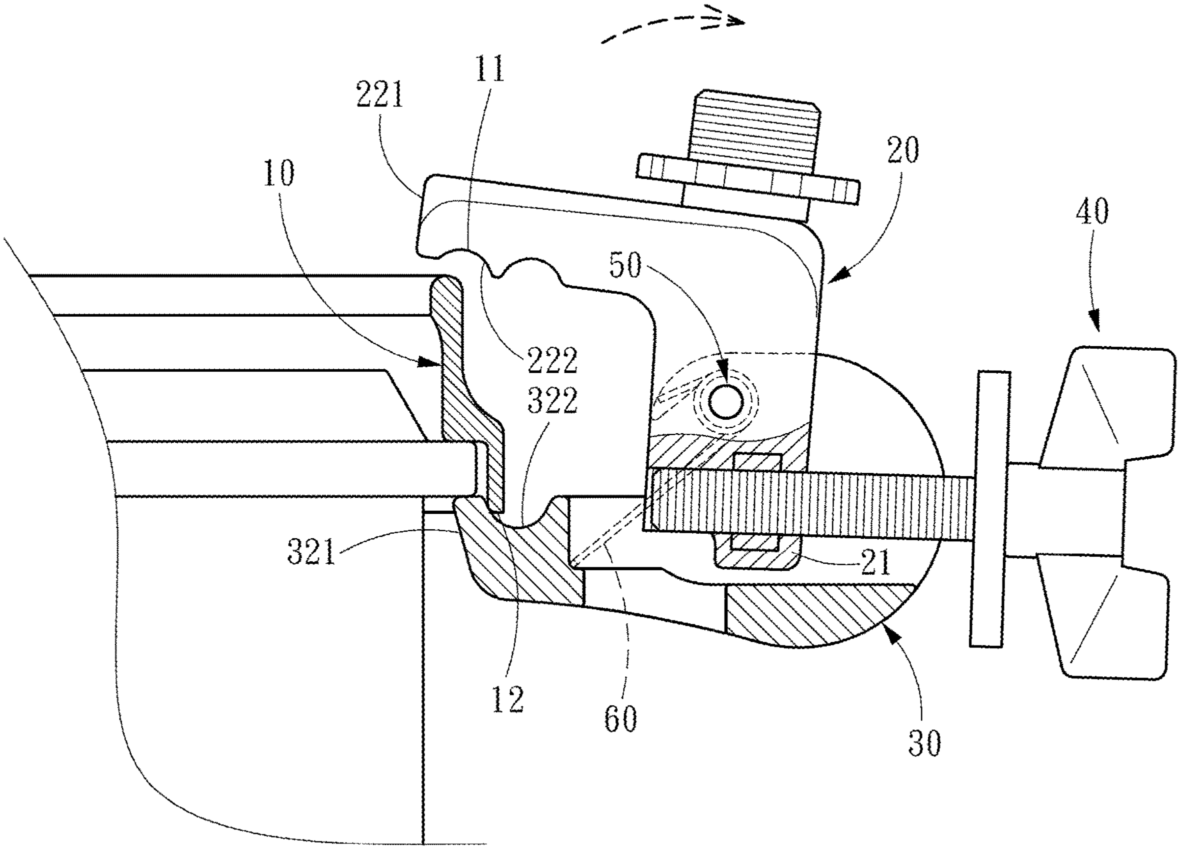

Referring also to FIG. 5A and FIG. 5B, in an example, the upper clamping end 221 includes an upper groove 222 for clamping an upper edge 11 of the drum frame 10, the lower clamping end 321 includes a lower groove 322 for clamping a lower edge 12 of the drum frame 10, the upper groove 222 and the lower groove 322 are securely buckled with the upper edge 11 and the lower edge 12 of the drum frame 10, respectively. In addition, for convenience in operation, the present invention further includes a return spring 60, wherein the return spring 60 is wound around the rotary shaft 50, and two ends of the return spring 60 abut against the lower clamping piece 30 and the upper clamping piece 20, respectively. When the screw locking piece 40 is unscrewed, the upper clamping end 221 and the lower clamping end 321 (as shown in FIG. 5B) are automatically opened by an elastic force of the return spring 60, thereby improving the convenience in use.

Figure 2:
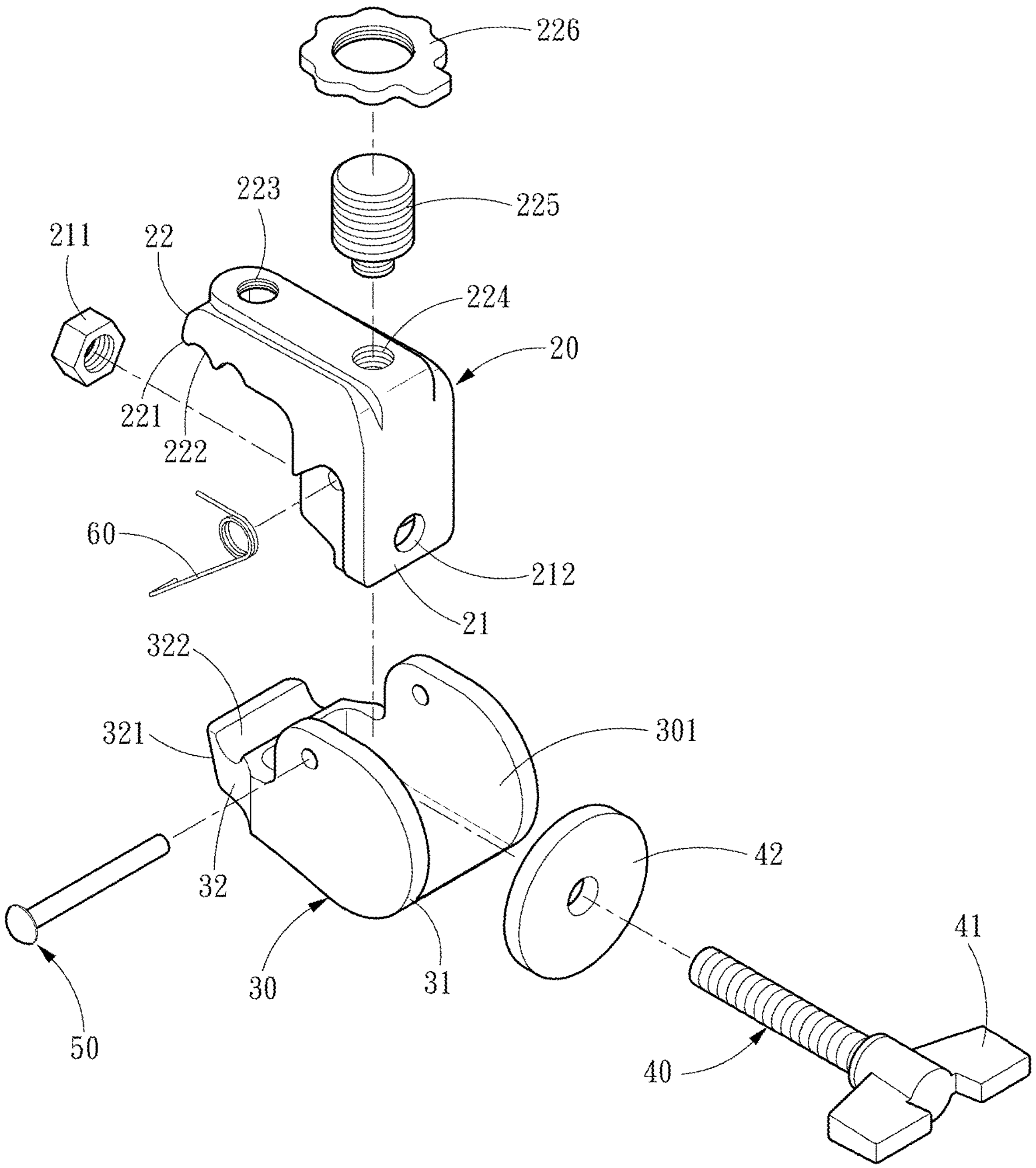
FIG. 2 is an exploded structural view of the present invention.
Figure 3:
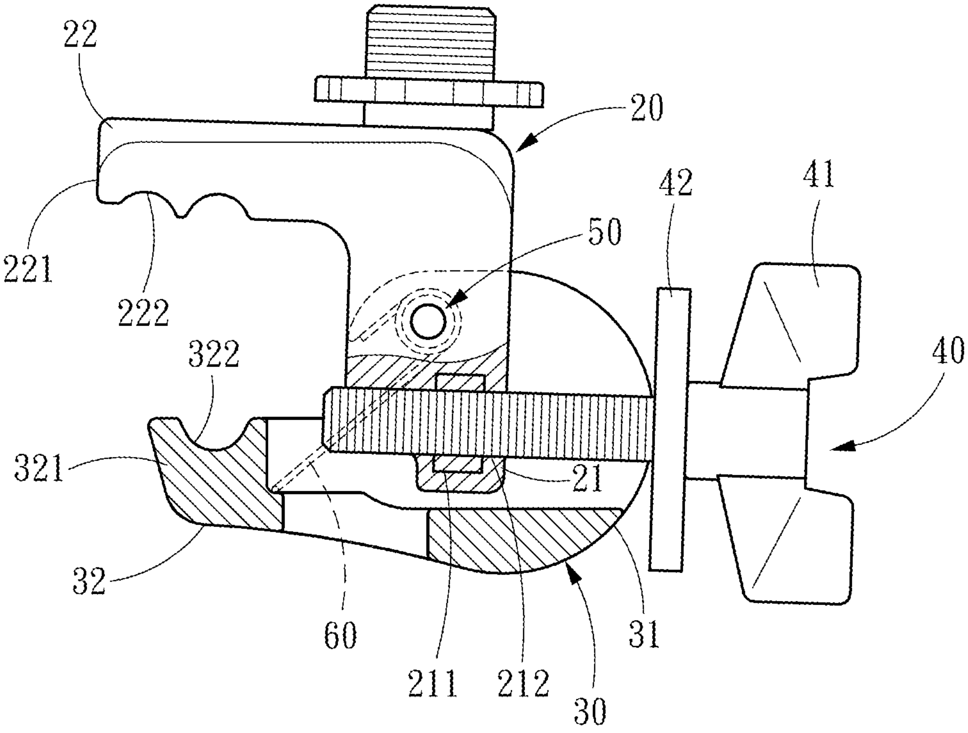
FIG. 3 is a schematic cross-sectional view of the present invention.
Figure 4:
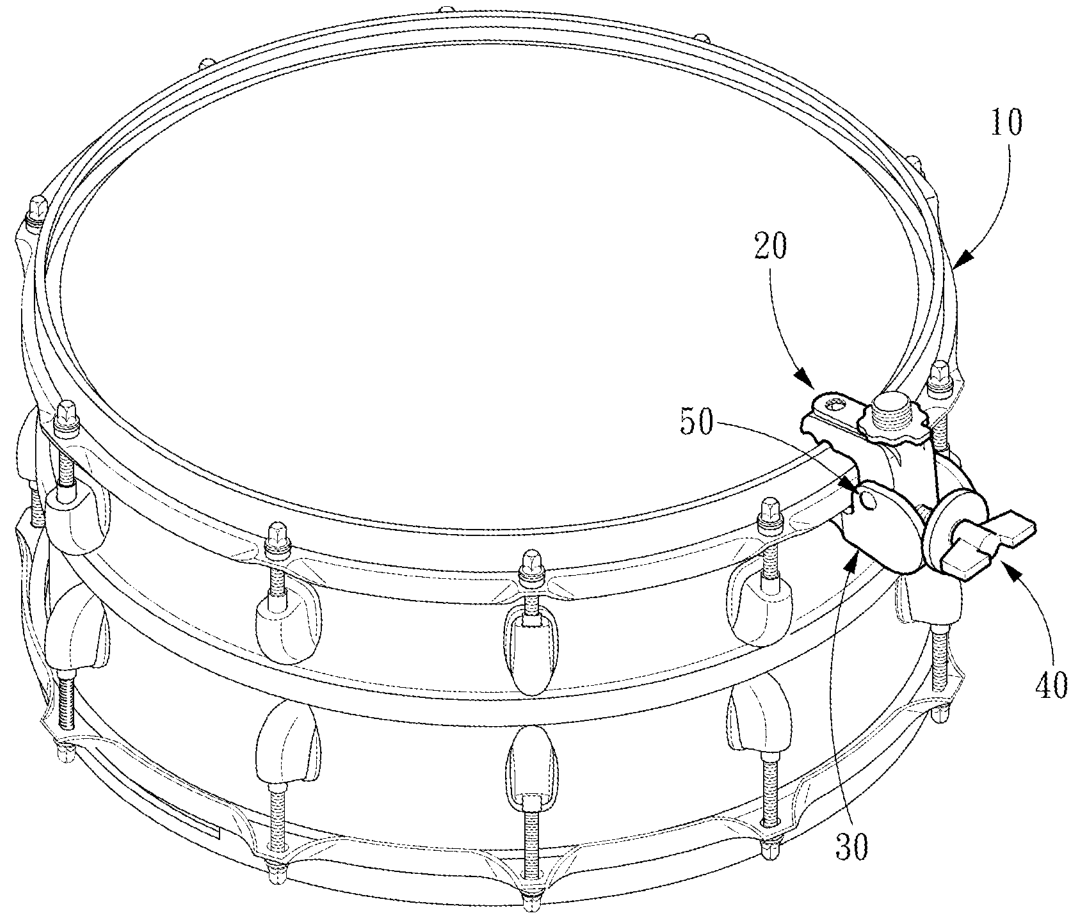
FIG. 4 is a schematic view of the use of the present invention.
Figure 6:
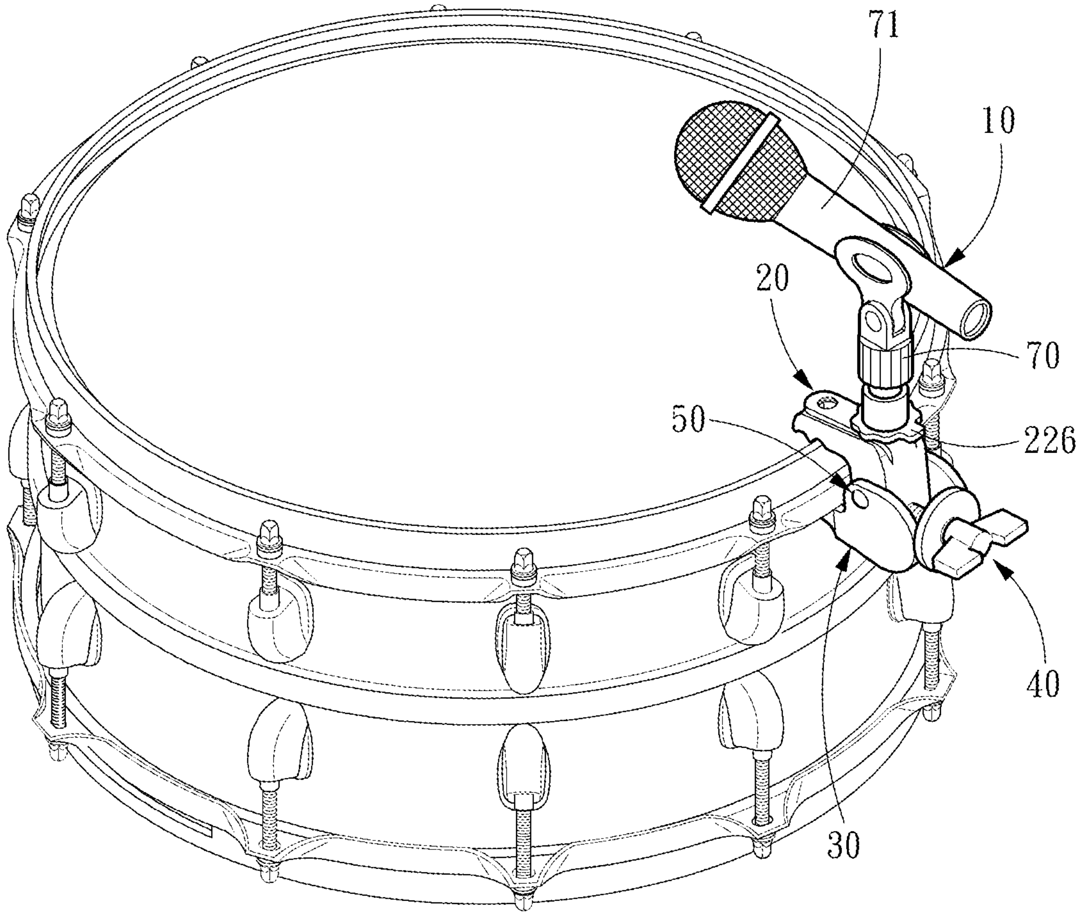
FIG. 6 is a schematic view of erecting a radio device according to the present invention.

Furthermore, referring also to FIG. 2 and FIG. 6, the upper clamping piece 20 is provided with at least one locking hole 223, 224 facing upwards to serve as a locking and connecting structure for arranging various musical instruments or auxiliary devices, such as a cymbal, a microphone, a camera and a mobile phone. In an example, an adapter screw 225 with different outer diameters is screwed into the locking hole 224, the adapter screw 225 is locked with a liner ring 226 and a radio bracket 70, and a radio device 71, such as the microphone, can be erected on the radio bracket 70.

As described above, the present invention at least has the following advantages.

1. The drum frame can share weights of various musical instruments or auxiliary devices arranged on the locking and connecting structure, and a force cannot be directly applied to the screw locking piece, so that the screw locking piece of the present invention is smooth in operation and not easy to generate noise interference, and the drum frame can be loosened or clamped as long as the screw locking piece is rotated, so as to meet the requirements of rapid assembly and disassembly.

2. The return spring is arranged, so that the upper clamping end and the lower clamping end can be automatically opened, thereby improving the convenience in use.

3. Through the design that the driving part is embedded with the nut non-rotated relative to the driving part, the driving part can be made of plastic steel to have a shock absorption capability, so as to effectively reduce noise interference.

What is claimed is:

1. A drum frame clamping stand used for being clamped and fixed on a drum frame, comprising:

an upper clamping piece provided with a locking and connecting structure;

a lower clamping piece, wherein the upper clamping piece and the lower clamping piece are pivotally connected with each other through a rotary shaft, a driving part and a driven part are respectively formed on two sides of the rotary shaft by the upper clamping piece, the driven part comprising an upper clamping end positioned on the drum frame, the lower clamping piece comprising an abutting curved surface and a fixing part, the fixing part comprising a lower clamping end positioned below the drum frame; and a screw locking piece, wherein the screw locking piece passes through the driving part in a screw locking manner and abuts against the abutting curved surface of the lower clamping piece, spiral rotation of the screw locking piece drives the driving part to move, and the upper clamping piece is rotated relative to the lower clamping piece, the upper clamping end is closed to the lower clamping end to clamp the drum frame.

2. The drum frame clamping stand according to claim 1, wherein the driving part is embedded with a nut non-rotated relative to the driving part, and the driving part comprises a through hole, the nut is exposed via the through hole, and the screw locking piece passes through the through hole and is screwed onto the nut.

3. The drum frame clamping stand according to claim 1, wherein the lower clamping piece comprises an accommodating groove, and the driving part of the upper clamping piece is placed into the accommodating groove.

4. The drum frame clamping stand according to claim 1, wherein the screw locking piece comprises a knob head and a pushing plate for abutting against the abutting curved surface.

5. The drum frame clamping stand according to claim 1, wherein the upper clamping end comprises an upper groove for clamping an upper edge of the drum frame, the lower clamping end comprises a lower groove for clamping a lower edge of the drum frame.

6. The drum frame clamping stand according to claim 1, further comprising a return spring, wherein the return spring is wound around the rotary shaft, and two ends of the return spring respectively abut against the lower clamping piece and the upper clamping piece.

7. The drum frame clamping stand according to claim 1, wherein the locking and connecting structure comprises at least one locking hole facing upwards.

8. The drum frame clamping stand according to claim 7, wherein an adapter screw with different outer diameters is screwed into the locking hole, the adapter screw is locked with a liner ring and a radio bracket, and a radio device is erected on the radio bracket.

* * * * *